US009555599B2

(12) United States Patent
Van Berlo

(10) Patent No.: US 9,555,599 B2
(45) Date of Patent: Jan. 31, 2017

(54) METHOD OF FORMING SINGLE FACE CORRUGATED BOARD

(71) Applicant: CORCEL IP LIMITED, Hamilton (NZ)

(72) Inventor: Patrick Petrus Antonius Maria Van Berlo, Cambridge (NZ)

(73) Assignee: CORCEL IP LIMITED, Hamilton (NZ)

( * ) Notice: Subject to any disclaimer, the term of this patent is extended or adjusted under 35 U.S.C. 154(b) by 0 days.

(21) Appl. No.: 14/300,576

(22) Filed: Jun. 10, 2014

(65) Prior Publication Data

US 2015/0010734 A1 Jan. 8, 2015

Related U.S. Application Data

(62) Division of application No. 12/994,745, filed as application No. PCT/NZ2009/000085 on May 26, 2009, now Pat. No. 8,795,458.

(30) Foreign Application Priority Data

May 27, 2008 (NZ) ........................ 568698

(51) Int. Cl.
*B31F 1/22* (2006.01)
*B31F 1/20* (2006.01)
(Continued)

(52) U.S. Cl.
CPC . *B32B 7/14* (2013.01); *B05D 1/28* (2013.01); *B31F 1/2818* (2013.01);
(Continued)

(58) Field of Classification Search
CPC ............... B31F 1/22; B31F 1/24; B31F 1/26; B31F 1/28; B31F 1/2818; B32B 3/28; B32B 29/08; B32B 37/00; B32B 37/0076; B32B 37/0084; B32B 37/12; B32B 37/1284; B32B 37/1292; B32B 7/14; B29C 65/48; B29C 65/52; B29C 65/526; Y10T 156/1016; Y10T 156/1025
(Continued)

(56) References Cited

U.S. PATENT DOCUMENTS 2,102,937 A 12/1937 Bauer
2,188,456 A 1/1940 Galber
(Continued)

FOREIGN PATENT DOCUMENTS

CA 1071085 A 2/1980
CN 1150403 A 5/1997
(Continued)

OTHER PUBLICATIONS

Supplementary European Search Report, in European Application No. EP 09 77 0447, dated Apr. 1, 2014.

*Primary Examiner* — Philip Tucker
*Assistant Examiner* — Brian R Slawski
(74) *Attorney, Agent, or Firm* — Knobbe, Martens, Olson & Bear, LLP

(57) ABSTRACT

A method of bonding a substantially planar sheet material to a corrugated sheet material using an automated process the method characterized by the steps of
a) applying adhesive in discrete amounts to the contact points of the corrugated sheet material, and
b) holding the sheet materials together until a bond is formed between them.

2 Claims, 4 Drawing Sheets

(51) Int. Cl.

| | | |
|---|---|---|
| *B65C 3/16* | (2006.01) | |
| *B32B 7/14* | (2006.01) | |
| *B29C 65/00* | (2006.01) | |
| *B32B 37/00* | (2006.01) | |
| *B65C 9/25* | (2006.01) | |
| *C09J 5/00* | (2006.01) | |
| *B31F 1/00* | (2006.01) | |
| *B32B 3/28* | (2006.01) | |
| *B32B 3/30* | (2006.01) | |
| *B05C 1/00* | (2006.01) | |
| *B05D 1/10* | (2006.01) | |
| *B31F 1/28* | (2006.01) | |
| *B32B 29/08* | (2006.01) | |
| *D21H 23/56* | (2006.01) | |
| *D21H 23/58* | (2006.01) | |
| *D21H 27/40* | (2006.01) | |
| *B05D 1/28* | (2006.01) | |
| *B65D 65/40* | (2006.01) | |
| *B32B 37/10* | (2006.01) | |
| *B32B 37/12* | (2006.01) | |
| *B32B 37/20* | (2006.01) | |
| *B32B 7/12* | (2006.01) | |
| *B32B 15/04* | (2006.01) | |
| *B32B 15/20* | (2006.01) | |
| *B32B 27/00* | (2006.01) | |
| *B32B 29/00* | (2006.01) | |

(52) U.S. Cl.
CPC .............. *B31F 1/2895* (2013.01); *B32B 3/28* (2013.01); *B32B 7/12* (2013.01); *B32B 15/04* (2013.01); *B32B 15/20* (2013.01); *B32B 27/00* (2013.01); *B32B 29/002* (2013.01); *B32B 29/08* (2013.01); *B32B 37/0053* (2013.01); *B32B 37/0076* (2013.01); *B32B 37/10* (2013.01); *B32B 37/1292* (2013.01); *B32B 37/20* (2013.01); *B65D 65/403* (2013.01); *C09J 5/00* (2013.01); *D21H 23/56* (2013.01); *D21H 23/58* (2013.01); *D21H 27/40* (2013.01); *B32B 2317/127* (2013.01); *B32B 2439/00* (2013.01); *Y10T 156/1016* (2015.01); *Y10T 156/1025* (2015.01); *Y10T 156/1033* (2015.01); *Y10T 156/1729* (2015.01); *Y10T 428/24669* (2015.01); *Y10T 428/24694* (2015.01)

(58) Field of Classification Search
USPC ....... 156/210, 292, 295, 324, 462, 472, 548, 156/550; 428/182; 493/337; 264/286
See application file for complete search history.

(56) References Cited

U.S. PATENT DOCUMENTS

| | | |
|---|---|---|
| 3,688,736 A | 9/1972 | Beck et al. |
| 3,783,074 A | 1/1974 | Normanton |
| 3,914,521 A | 10/1975 | Beatty et al. |
| 3,972,763 A * | 8/1976 | Wolvin et al. ............... 156/210 |
| 4,079,328 A | 3/1978 | Cleland et al. |
| 4,223,633 A | 9/1980 | Alvensleben et al. |
| 4,254,173 A | 3/1981 | Peer, Jr. |
| 4,286,006 A | 8/1981 | Boelter |
| 4,344,379 A * | 8/1982 | Roberts .................. D06B 1/143 118/212 |
| 4,348,250 A | 9/1982 | Bromley |
| 4,474,293 A | 10/1984 | Osborne |
| 4,542,566 A | 9/1985 | Sukenik |
| 4,544,597 A | 10/1985 | Peer et al. |
| 4,561,918 A | 12/1985 | Scharfenberg et al. |
| 4,882,005 A * | 11/1989 | Thompson ........... B05C 1/0808 118/212 |
| 4,917,664 A | 4/1990 | Lacaux |
| 5,147,480 A | 9/1992 | Lang |
| 5,437,752 A | 8/1995 | Lang |
| 5,489,081 A | 2/1996 | Coffey |
| 5,609,711 A | 3/1997 | Miller |
| 6,006,806 A | 12/1999 | Marschke |
| 6,079,329 A | 6/2000 | Goovaard et al. |
| 6,143,113 A | 11/2000 | Berube |
| 6,153,037 A | 11/2000 | Kim et al. |
| 6,155,320 A | 12/2000 | Finke et al. |
| 2007/0204578 A1 | 9/2007 | Sundvik et al. |
| 2009/0117376 A1 | 5/2009 | Bloembergen et al. |

FOREIGN PATENT DOCUMENTS

| | | |
|---|---|---|
| CN | 2299711 Y | 12/1998 |
| EP | 0034906 A1 | 9/1981 |
| EP | 0151088 A2 | 8/1985 |
| EP | 0319252 A2 | 6/1989 |
| EP | 0657285 B1 | 9/1997 |
| EP | 0828603 B1 | 1/2002 |
| GB | 565 370 A | 11/1944 |
| GB | 1038906 A | 8/1966 |
| GB | 1172914 A | 12/1969 |
| GB | 2153296 A | 8/1985 |
| JP | 56-135056 A | 10/1981 |
| JP | 57-089946 A | 6/1982 |
| JP | S59-124842 A | 7/1984 |
| JP | S61-158434 A | 7/1986 |
| JP | S63-139737 A | 6/1988 |
| JP | H06-219443 A | 8/1994 |
| JP | H10-305497 A | 11/1998 |
| JP | 11-207839 A | 8/1999 |
| JP | 11-338477 | 12/1999 |
| JP | 2005-090563 | 4/2005 |
| JP | 2007-168181 | 7/2007 |
| JP | 2007-255112 | 10/2007 |
| WO | WO 85/05072 A1 | 11/1985 |
| WO | WO 90/06222 A1 | 6/1990 |
| WO | WO 95/35202 A1 | 12/1995 |
| WO | WO 96/32250 A1 | 10/1996 |
| WO | WO 98/41400 A1 | 9/1998 |
| WO | WO 02/14061 A1 | 2/2002 |
| WO | WO 2005/056281 A1 | 6/2005 |
| WO | WO 2005/103183 A1 | 11/2005 |
| WO | WO 2005/103193 A1 | 11/2005 |
| WO | WO 2006/086754 A2 | 8/2006 |
| WO | WO 2009/145642 A1 | 12/2009 |

* cited by examiner

METHOD OF FORMING SINGLE FACE CORRUGATED BOARD

FIELD OF THE INVENTION

The present invention relates to a method and machine for forming single face corrugated board.

BACKGROUND ART

Single faced corrugated paper board is very well known and is used extensively in industry, especially in packaging where it is used as protective padding and wrapping. It is also used as a basic component in the production of many structural objects such as boxes, panels, pallets etc.

Sheets of single faced corrugated paper board can be bonded together to form multilayer corrugated paper boards of various thickness and strength. One reason for the wide use of such paper board is its relatively light weight, rigidity and strength.

Single faced corrugated paper board is made by bonding a fluted sheet, typically of corrugating medium (generally recycled paper) paper, onto a liner sheet. The liner sheet is typically Kraft paper although other materials may be used.

In a conventional machine for producing single faced fluted paper board, the fluted sheet is formed by passing a sheet of paper between two corrugating rollers. The two rollers are arranged such that there is an inter-meshing of the teeth at the periphery of each roller. A sheet of paper is fed between the teeth of the rollers which forces the paper into flutes as the teeth of the rollers intermesh. The fluted sheet is held in contact with the teeth on the periphery of one of the corrugating rollers, typically by a vacuum formed within the corrugating cylinder, at least until the liner is added.

A line of adhesive is applied to the crests of the flutes to bond the liner to the fluted paper. A sheet of liner paper is typically pressed onto the crests by a smooth roller so as to bond the liner with the fluted paper to form a single faced corrugated (or fluted) board.

A limiting factor in this process is the requirement to maintain contact between the fluted sheet and the liner for sufficient time for a bond to be formed. This time can be several seconds or longer at normal room temperatures and pressures. However, the time can be reduced by raising the temperature during the bonding process and by applying pressure to the join between the crest and the liner.

High pressure steam is commonly used to heat the cylinders over which the fluted paper and liner paper move, raising the temperature of the paper. Typical operating temperatures for the corrugating rollers can be around 200° C.

Pressure can be applied to the joint between the liner and each crest by a pressure roller arranged to press the liner against the glued crest. As the contact time between the pressure roller and corrugating roller (which holds the fluted sheet) is relatively short, high pressures are generally required to significantly speed up the bonding process.

With this type of arrangement (heating plus high pressure) the bonding time can be reduced to a few hundredths of a second, allowing high speed production of single faced paper board. However, one problem with this arrangement is that the high pressure exerted by the pressure roller can distort the paper and leave unsightly marks on the surface of the liner paper, reducing its value.

In some machines other devices, such as endless belts, are used to press the liner and fluted sheets together as they move around the corrugating roller. This extends the period of time pressure is applied, and therefore lower pressures can be used so as not to deform the surface of the paper board.

A typical arrangement of a machine to produce single faced paper board generally as described above is disclosed in U.S. Pat. No. 5,951,817 (Thomas).

The machinery depicted in U.S. Pat. No. 5,951,817 has a limited contact time (and hence bond time) between the fluted sheet and the liner—as evidenced by the fluted sheet/liner combination only being in contact with a third of the circumference of the corrugated wheel. Such limited contact time requires the use of a fast drying adhesive such as a starch based glue used typically in the industry. Unfortunately, starch based glues requires the application of heat (say in the order of 150° C. or so) to activate. This leads to disadvantages as discussed below.

Although the use of heat can shorten the time required to form a bond between the fluted sheet and the liner, and therefore allow high through-put, it does introduce a number of engineering issues which significantly increase the cost of the machinery and the operating costs for the process. The use of high pressure steam introduces the need for boilers, pipe work, and housing to ensure containment of the steam at all times. There is a need for additional safety measures to ensure that the steam is produced and managed correctly and that the heat produced does not provide a safety hazard during operation of the machine. Typically a heating engineer is required to operate the boiler and maintain the heating system, adding the cost of additional skilled labour, as well as potentially stopping production if such an engineer is not available.

The addition of a high pressure steam system to the basic elements of the machine inevitably leads to an increase in the size of the machine and therefore the space required for operation of the machine. The requirement for more space adds to the operating costs for production of the single faced fluted board.

Furthermore high pressure steam is highly corrosive to many materials, and those parts of the machine exposed to the steam, for example the corrugating rollers, need to be made from appropriate materials. Such materials, for example alloy steel 48 CrMo hardened to HRC 58-62 standard, are generally expensive and heavy. A machine made from such materials can require substantial support structure to maintain the structural integrity of the machine.

A problem with both methods of applying pressure (roller and belt) is that the applied pressure can spread some of the adhesive away from the contact line between the liner and the fluted sheet across the crest, thus wetting the surrounding paper. As this spread adhesive is not under pressure (once away from the contact line) and does not necessarily form a bond, further heating can be required in order to dry out the paper and superfluous (spread) adhesive. This adds to the cost of production and may limit the speed of the process.

The spread adhesive can also get transferred to the surface of the device applying the pressure (eg, roller or belt) requiring the surface of the device to be continually cleaned. Some adhesive can be transferred to the outer surface of the liner, which can cause problems during storage when rolled, as neighbouring sheets can stick together making the product unusable. Further, the adhesive can mark the surface, adversely affecting the appearance and reducing value of the corrugated board.

A further disadvantage with conventional machines is that typically the feed rollers used to feed the paper (both to be fluted and used as a liner) onto the corrugating rollers, and the corrugating rollers, are heated in order to dry out the paper prior to addition of the adhesive. This is to reduce the moisture content of the paper and to produce a rapid bonding time. The production of high pressure steam to heat the corrugating rollers and to pre-heat the paper can require a significant amount of energy.

All of the above factors can add significantly to the cost of single face fluted board made by conventional processes and machines.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicant reserves the right to challenge the accuracy and pertinency of the cited documents. It will be clearly understood that, although a number of prior art publications may be referred to herein, this reference does not constitute an admission that any of these documents form part of the common general knowledge in the art in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Further aspects and advantages of the present invention will become apparent from the ensuing description which is given by way of example only.

SUMMARY OF THE INVENTION

According to one aspect of the present invention there is provided a method of bonding a substantially planar sheet material to a corrugated sheet material using an automated process the method characterised by the steps of:
  a) applying adhesive in discrete amounts to contact points of the corrugated sheet material, and
  b) holding the sheet materials together until a bond is formed.

In a preferred embodiment the sheet material is Kraft paper.

Kraft paper is commonly used in the formation of single faced corrugated board. However, it is envisaged that other materials may be used with the present invention and reference throughout this specification to sheet material being Kraft paper only should not be seen as limiting.

For example, the corrugated sheet material may be made from: thin metal such as aluminium; recycled paper (in a form commonly referred to as a corrugating medium); and some plastics.

The liner may also be made from a variety of sheet materials including but not limited to: clay coated art paper (which may be pre-printed), glassen paper, as well as some plastics.

Reference to a substantially planar sheet material should be understood to refer to a sheet or web having a substantially flat surface, in which lies with a single plane a plane (at least when viewed with the naked eye).

In contrast a corrugated sheet material should be understood to refer to a sheet or web in which the surface is configured into a series of alternating crests and troughs (i.e. corrugations).

The corrugations in a corrugated sheet used to form a single faced corrugated paper board are commonly referred to as flutes. Flutes are typically formed by passing a sheet of Kraft paper through a pair of corrugating rolls set in relation to one another so that the teeth of the corrugating rolls intermesh-via on either side of the Kraft paper. The shape of the resulting flute is dependent on the shape and size of the teeth on the corrugating rolls. For example, (without limitation) a flute can be triangular, sinusoidal, trapezoidal, saw-tooth, rhombic, square or any other suitable repeating undulating shape. Similarly, the size of the flute is determined by the equi-sized of the teeth and may be varied depending on the end application for the single faced corrugated board.

In a preferred embodiment the corrugated sheet material has a substantially triangular section.

An advantage of forming flutes having a substantially triangular section is that it is relatively simple to form using conventionally formed teeth on the corrugating rolls.

Furthermore triangular shaped flutes may have added strength in comparison to some of the other shapes, particular against compression along the length of a flute.

The adhesive used to bond a liner to the crests of a fluted sheet, where the liner and the fluted sheet are formed from Kraft paper, is typically a water-based glue.

In the first step of the present invention water-based glue is applied in discrete amounts to contact points of the corrugated or fluted sheet material. In other words, the adhesive is applied in individually distinct amounts which are spaced apart across each crest of the fluted sheet.

The discrete or distinct amounts of glue can vary in form.

In one embodiment, the distinct amounts may be in the form of a smear, or an interrupted line or dash.

By having discrete amounts, less adhesive is applied to the fluted sheet than is the case with conventional methods. Further, separation between the discrete amounts enables some spread of adhesive to occur on to dry areas once pressure has been applied to the liner and the fluted sheet.

In a preferred embodiment the adhesive is applied across the crest in spaced apart droplets.

It is envisaged that the droplets will be small round, or pear shaped portions of adhesive that adheres to a surface, but this should not be seen as limiting.

The preferred size of the droplet may depend on a number of factors, including the nature of the fluted paper and liner and the type of adhesive used. However, in all cases the droplet size should be small enough that the droplet substantially retains its form and does not collapse under its own weight. This is important as the relatively high volume to surface area (in comparison say to a strip or line of adhesive) reduces the rate of evaporation of moisture from the droplet, thus extending the time available for the droplet of adhesive to wet and penetrate the crest of the fluted paper and the liner prior to the adhesive drying out.

A preferred droplet size is in the order of $0.5 \text{ mm}^3$. The preferred gap between droplets is calculated by ascertaining the desired adhesive thickness when spread and placing the droplets apart so when the spread droplets reach that thickness they just meet each other.

Applying the adhesive as droplets provides at least one or more of the following exemplary advantages:
  Each droplet is applied directly to the crest of the fluted paper, reducing the amount of adhesive that may inadvertently be applied to the sides of the crest by other methods and thus also lessens the amount of wetting of the paper and drying time required.

Using droplets instead of applying a broad strip or line of adhesive (as in the prior art) may significantly reduce the amount of adhesive applied to each crest, saving cost.

If the same quantity of adhesive as is applied in droplet form were to be applied as a flat strip across the crest the adhesive (due to the increased surface area) would dry out in a relatively short time and may not be able to wet the liner in order to form a bond. With some adhesives it may be possible for droplets to remain exposed on the crests of the fluted paper for several minutes, for example if the machine is stopped for a short period of time, and still be able to wet the liner and form a bond when the machine is restarted. This may not be possible if the adhesive is applied in other forms, such as in a strip.

Preferably the droplets are spaced apart such that, when the liner is pressed against the crest of the fluted paper, the droplets spread to form a substantially continuous thread of adhesive between the liner and the crest. The thread formed by compressing the spaced apart droplets may result in a substantially finer line of adhesive than that in conventional methods where the strip is applied by a smooth roller pressing against the crest. This arrangement results in an effective, continuous bond being formed along the crest with a significantly reduced amount of adhesive used in comparison with conventional methods.

The time taken to form a bond between a crest of the fluted sheet and the liner will be referred to as the bonding period. The bonding period for a particular adhesive depends on the temperature at which the bond is formed and the pressure applied between the crest and liner.

However, the applicant envisages that the present method may be used to produce single face corrugated board without the application of heat—i.e., substantially at ambient temperature—say 5° C.-30° C. At ambient temperature the bonding period may vary as a function of the amount of glue applied (as droplets) and the pressure applied between the liner and the crest of the flute, with shorter bonding periods for higher applied pressures and less glue.

It should be appreciated that the choice of adhesive of the present invention is important. As noted in the Background Art, starch based adhesives require a activation temperature in the order of 150° C. Thus, such an adhesive would not be desirable for use with the present invention. Suitable adhesives that can set rapidly at room temperature, and has the required strength are discussed later on in this specification.

It is of significant advantage of the present invention that it enables the board to produce without the application of heat. As discussed further in the specification, this removes the need for expensive machinery and energy requirements. It should be appreciated that it is the recognition that the application of discrete amounts of adhesive enables the significant advantage to be achieved through shorter bonding time at ambient temperatures.

In the second step of the method according to the present invention the liner is pressed against the fluted sheet for a time sufficient to allow a bond to form. This may be achieved by a variety of means.

In a preferred embodiment the planar sheet is pressed against the corrugated sheet by a tensioned endless belt.

The exertion of pressure on a liner to press it against a fluted sheet by use of a tensioned endless belt, is well known in the art and the equipment to do so need not be discussed in further detail.

The pressure may be adjusted to be at, or just below, the maximum pressure that can be applied without deforming the paper (liner and fluted papers). Excessive pressure can lead to creasing and/or tearing of the paper. The maximum pressure will vary depending on the material used for the liner and fluted paper.

In a preferred embodiment the sheet materials are held together for a period not less than two seconds.

The applicant has found that using an endless belt tensioned to hold the liner firmly against the crests without damaging the liner, and with suitable commercially available adhesive, the liner and fluted sheet need to be pressed together for a period (pressing time) longer than about two seconds at room temperature to ensure the liner and fluted board form a good bond.

Typically, for pressing times less than around two seconds, or if the pressure between the sheets is too little, a single faced corrugated board will not be formed. In such cases, the tension in the corrugated sheet is sufficient to break the bond, so that the liner comes away from the fluted sheet.

For practical purposes at room temperature holding times between two seconds and four seconds are desirable, with a pressing time of around three seconds being preferred. Pressing times greater than four seconds may be used, but are not preferred as such times may significantly reduce the production rate of single face corrugated board.

A pressing time of around three seconds is significantly slower than that achieved by some prior art machines through the use of a combination of high temperature and high pressure. However, an advantage of the present invention is that it may produce quantities of single face corrugated board at an acceptable rate at room temperature. This provides the advantage of a process and apparatus which may produce single face corrugated board at a reduced cost and in a safe and environmental friendly manner.

The inventor considers the combination of the discrete application of adhesive droplets with an increased holding time (as compared to conventional machines) enable an adhesive to be used that can set at room temperature.

In a preferred embodiment the adhesive is a water-based dispersion containing vinyl acetate copolymer.

A water-based adhesive containing vinyl acetate copolymer in dispersion may be preferred as, under normal use, it is a non-hazardous substance, and therefore can be used safely provided normal ventilation is provided.

Vinyl acetate copolymer dispersions can be relatively quick setting at room temperature and do not require a high activation temperature—unlike starch based glues. They have a low viscosity, good adhesion and a long open time. A relatively low viscosity is required to allow the adhesive to flow readily, (e.g., when being transferred from an applicator to the fluted sheet) while a good adhesion provides the ability to adhere quickly to a surface.

The open time is a measure of the time, under normal temperature and pressure, that the adhesive can have an exposed surface before it loses its ability to wet the opposing surface and penetrate into the opposing surface fibres. This wetting and penetration is required to form an effective bond between the fluted paper and the liner. An adhesive having a relatively long open time is preferred as the adhesive may be open to the atmosphere for some time prior to application to the flutes.

Preferably the adhesive is Adhesin™ Z9129W, a vinyl acetate copolymer supplied by Henkel New Zealand Limited. The applicant has found that Adhesin™ Z9129W has the required viscosity, and long open time required for use with the present invention. For example, Adhesin™ Z9129W has a viscosity in the range 2100-2200 m·Pa·S and an open time of between 0.5 to 1 minute. However, it is envisaged that other adhesives having similar properties may also be used.

Applying an adhesive (such as Adhesin™ Z9129W) in droplet form to the crest of a fluted sheet, and pressing a liner against the crest for around 3 s to form a bond between the fluted sheet and liner, provides a number of significant advantages over the prior art. In particular, the method may be used to produce single face corrugated paper board at room temperature. As a result there is no need for heating of the corrugating rolls or drying out of the single face corrugated board. This may translate into a significant reduction in energy use and hence lower the production cost of the paper board.

According to another aspect of the present invention there is an applicator for applying adhesive in a discrete amount, including a roller characterised in that the outer surface of the roller has a contoured surface.

The contoured surface can come in a number of forms and in one embodiment they may be dimpled or an irregular surface. In some embodiments the surface may be in the form of a U-shaped groove.

Preferably however, the contoured surface is in the form of fine corrugations reminiscent of a square wave.

Reference to a corrugated surface should be understood to refer to a surface formed into a series of crests and troughs.

In a preferred embodiment the crests (and troughs) are substantially parallel and extend around the circumference of the roller.

In a preferred embodiment the crests form a spiral.

A series of crests may be formed across the surface of the roller by making a spiral cut around the surface of the roller in a similar manner to forming a (non-tapered) screw thread. A spiral cut, or screw thread, may be relatively easy to machine into a smooth surface of a roller. This may reduce the cost of forming an applicator in comparison with other types or arrangements of crests.

In other embodiments the crests may form concentric circles.

Preferably the crests and troughs may be formed by cutting (or otherwise shaping) a 'V' or square shaped groove in the surface of the applicator. The actual shape of the groove is not critical, but a 'V' shaped groove is preferred as it is relatively easily cut into a smooth cylindrical surface.

In use, adhesive may be supplied to the applicator by a smooth surface pick-up roller.

For example, spray nozzles may be used or an air blade that passes through a trough.

In an embodiment that has a pick up roller, the pick-up roller is mounted adjacent to an adhesive bath such that as the pick-up roller rotates its outer surface is coated with adhesive.

The applicator is mounted with respect to the pick-up roller such that the crests of the applicator make firm contact with the surface of the pick-up roller. In this way adhesive is transferred from the surface of the pick-up roller into the grooves in the surface of the applicator, with little or no adhesive being applied to the crests of the applicator.

The gap between the pick up roller and the roller that forms part of the applicator determines the amount of glue being applied.

The mounting of the applicator is also such that the crests of the applicator make firm contact with the crests of the fluted sheet on the corrugating roll. With this arrangement as the applicator rotates it picks up adhesive in the grooves on its surface as it contacts the pick-up roller, and then deposits the adhesive as droplets onto the crests of the fluted sheet.

The amount of adhesive for each droplet may be determined by the size (width and depth) of each groove, while the separation of the droplets may be determined by the separation of adjacent grooves.

It should be appreciated that the groove should be sufficiently shallow to avoid to much glue being deposited onto the paper. In a preferred embodiment, the depth of the groove is only 0.5 mm and width of the groove is only in the order of 1 mm. This may of course vary in according to the requirements of the invention.

In a preferred embodiment the crest may take the form of a sharp edge.

Preferably, the 'V'-shaped grooves are arranged such that each groove abuts the adjacent grooves to form a sharp edge so that a section through a series of grooves forms a continuous zigzag pattern. This arrangement may provide the minimum separation between adjacent droplets (for a given width of each groove).

In some other embodiments the crests may have a flat section, in which case the separation of the droplets may be correspondingly larger.

According to another aspect of the present invention there is provided a machine for making single faced corrugated board by bonding a corrugated sheet material having one or more crests onto a substantially planar sheet, the machine including an applicator configured to apply adhesive to each crest of the corrugated sheet material, and a pressing mechanism for pressing the planar sheet against the crest of the corrugated material charaterised in that the applicator is configured to apply adhesive in discrete amounts to the crest of the corrugated sheet material and the pressing mechanism is configured to press the liner sheet against the crest until a bond is formed between them.

A machine for making single face corrugated board according to the present invention has many features in common with some prior art machines. In particular a fluted sheet is formed by passing a sheet material between the intermeshed teeth of first and second corrugating rolls. The fluted sheet is held against the second corrugating roll, which typically has a larger diameter than the first corrugating roll, by a vacuum created inside the second corrugating roll.

As the second corrugating roll rotates the fluted paper passes an applicator where adhesive is applied to the crests of the fluted sheet.

In a preferred embodiment the applicator includes a roller having a corrugated surface substantially as described above.

The corrugated surface of the applicator (as described above) is configured to apply droplets of adhesive across a crest of a fluted sheet. This is in contrast to conventional machines in which the applicator typically has a knurled surface so as to spread a relatively broad strip or line of adhesive across the crest of the flute.

The applicator is rotatably mounted such that the outer surface (crests) of the applicator press against the crests of the fluted paper held on the second corrugating roll.

In a preferred embodiment the pressing mechanism is a tensioned endless belt.

An endless belt may be configured to move around a plurality of rollers, the rollers arranged such that the belt is held in contact with the liner as the liner and fluted sheet move around the periphery of the second corrugating roll.

This arrangement may be achieved by placing two end guide rollers spaced apart around the periphery of the second corrugating roller, the spacing defining the distance over which the belt contacts the liner. The two end guides may be mounted so as to provide pressure (via the belt) onto the liner as it initially contacts the fluted sheet, and again just before the single face fluted sheet is removed from the second corrugating roll.

The belt may be tensioned by adjustment of one or more of the remaining rollers so that the belt applies pressure to the liner to press it against the fluted sheet.

As there is no heating required, a standard rubber belt may be used, rather than the more exotic materials used with heated rollers. Use of a standard rubber belt may result in less damage to the surface of the liner, and hence a superior product.

In other embodiments the endless belt may be made of plastics or synthetic material.

An advantage of the present method, when applied at room temperature, is that the endless belt may be formed using heat sensitive materials such as plastics, synthetics and some rubbers that would not be suitable in conventional, heated processes.

In a preferred embodiment the endless belt is configured to press the sheet materials together for more than 2 seconds.

In a preferred embodiment the endless belt is configured to press the sheet materials together for a time between about 2 seconds and about 4 seconds.

Generally with the belt tensioned tightly against the liner, the time taken to form a bond at normal room temperature is more than 2 seconds. In general, a time of around 3 seconds is preferred as this has been found to provide a reliable bond throughout the normal range of ambient temperatures—say 5° C.-30° C.

The production rate of single face corrugated board using such a machine depends on several factors, including the diameter of the second corrugating roll, the percentage of the periphery of the second corrugating roll that the belt is pressed against, and the speed of rotation of the second corrugating roll. These factors may be varied so that pressure is applied between the liner and the fluted sheet for the time required to form a bond at room temperature. Once a convenient arrangement has been found, the production rate can be determined by scaling the factors. For example, if the percentage coverage of the second corrugating roll by the endless belt is fixed, the production rate can be varied by choosing an appropriate diameter and speed of rotation of the second corrugating roll.

The main advantage of the method of the present invention is that it provides the ability to form single face corrugated board at room temperature at a rate that may be comparable to conventional methods.

In other words, the present invention allows the efficient production of single phase corrugated board without requiring additional heat to be applied to the process.

This feature is achieved by the combination of applying adhesive to the fluted paper in droplet form, followed by pressing the liner against the fluted sheet until a bond is formed. Application of droplets alone (without applying pressure), or applying adhesive as a strip or line (as in conventional methods) followed by pressing, both may result in the time taken to form a bond (and hence form single face corrugated board) is too long to be practicable commercially.

However by combining the two aspects, the time required to form a bond may be reduced to around 3 seconds at room temperature.

The ability to form single face corrugated board at room temperatures provides one or more of the following advantages over the prior art.

Saving in energy cost and a lower carbon footprint than conventional methods through removing the need to heat the corrugating rolls and to dry the paper. This removes the requirement for high pressure steam which is very energy intensive.

Saving in the cost of machinery. As heating is not required, there is a significant saving in not requiring boilers, pipe work and containment for high pressure steam. Further, as the machine is operated at room temperatures it can be constructed from simpler and less expensive materials, such as (without limitation) ceramics, plastics or wood. As such materials are generally easier to form and lighter than the materials (generally hardened steel) used in conventional machines that use steam, the machine may be cheaper to make and be supported by a lighter frame, again saving on material cost.

Saving in space. Removal of the apparatus associated with heating may result in a machine that requires less space than conventional, heated machines.

Improved safety. As the machine operates at room temperature, the hazards associated with production and use of high pressure steam are no longer present.

Saving in operating costs. Apart from a reduction in energy usage, the present method may result in significantly less consumption of adhesive.

Importantly a machine according to the present invention may be of a size and cost that makes it suitable for on-site production of single face corrugated board. Conventional heated machines are typically large, energy intensive and expensive to construct and operate. As a consequence such machines are commonly operated in centralised locations, with the single faced corrugated board, or products made from it, transported to consumers.

The size of the machine according to the present invention is scalable, mainly because no heating apparatus is required. Hence, a machine according to the present invention may be of a size suitable for installation and operation on the site of the consumer, for example to make packaging on site. This may provide savings to the consumer, as supply would be controlled by the consumer, and there would be no transport and handling costs from off-site production.

BRIEF DESCRIPTION OF DRAWINGS

Further aspects of the present invention will become apparent from the following description which is given by way of example only and with reference to the accompanying drawings in which.

DETAILED DESCRIPTION OF THE PREFERRED EMBODIMENT

Figure 1:
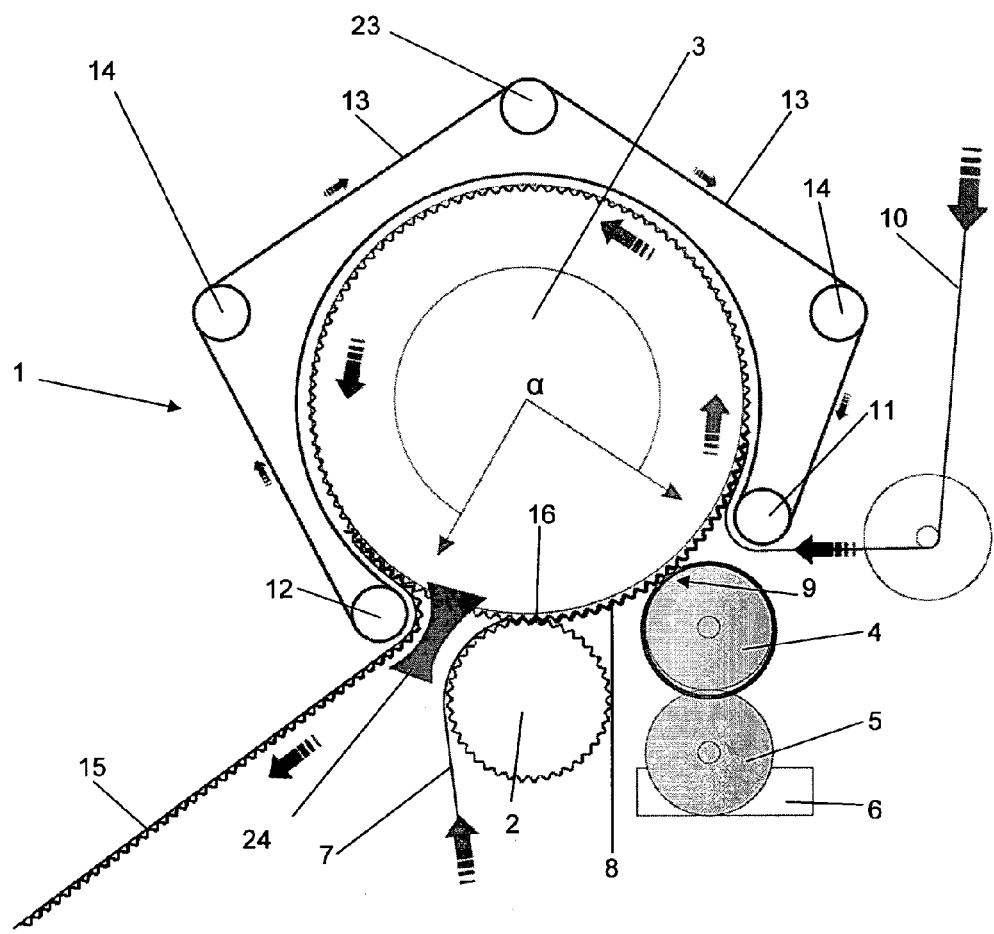
FIG. 1 shows a schematic side elevation of part of a single facer machine according to one embodiment of the present invention.

A portion of a machine for forming single faced corrugated board is generally shown by arrow (1) in the schematic side elevation shown in FIG. 1.

A first corrugating roller (2) has teeth (2') arranged around the periphery of the first corrugating roller (2), the teeth (2') extending laterally across the width of the first corrugating roller (2).

A second corrugating roller (3) has teeth (3') around its periphery. The diameter of the second corrugating roller (3) is substantially larger than the diameter of the first corrugating roller (2).

The corrugating rollers (2 and 3) are arranged such that teeth (2') of the first corrugating roller (2) intermesh with the teeth (3') of the second corrugating roller (3) in the region indicated by number (16).

The first corrugating roller (2) is powered to rotate in a clockwise direction and the second corrugating roller (3) is powered to rotate in an anticlockwise direction, as indicated by the respective dashed arrows.

A planar sheet material, in the form of a sheet of Kraft paper (7), is fed around the first corrugating roller (2) and between the intermeshed teeth in the region of arrow (16). The action of the teeth as they intermesh folds the Kraft paper into a series of crests to form a fluted sheet (8).

The Kraft paper may be recycled or virgin paper and ideally in the order of 90 to 150 gsm.

The second corrugating roller (3) includes open passageways (not shown) so that a partial vacuum can be created inside the corrugating roller (3) by connecting a vacuum pump (not shown) to one end of the corrugating roller (3). This partial vacuum inside the second corrugating roller (3) is used to hold the fluted sheet (8) in place against the teeth (3') of the second corrugating roller (3).

An applicator in the form of a glue roller (4) has an outer surface configured as a series of crests and troughs which extend around the circumference of the roller. The crests are formed by a spiral 'V' shaped cut extending around and across the surface of the glue roller (4).

Figure 2:
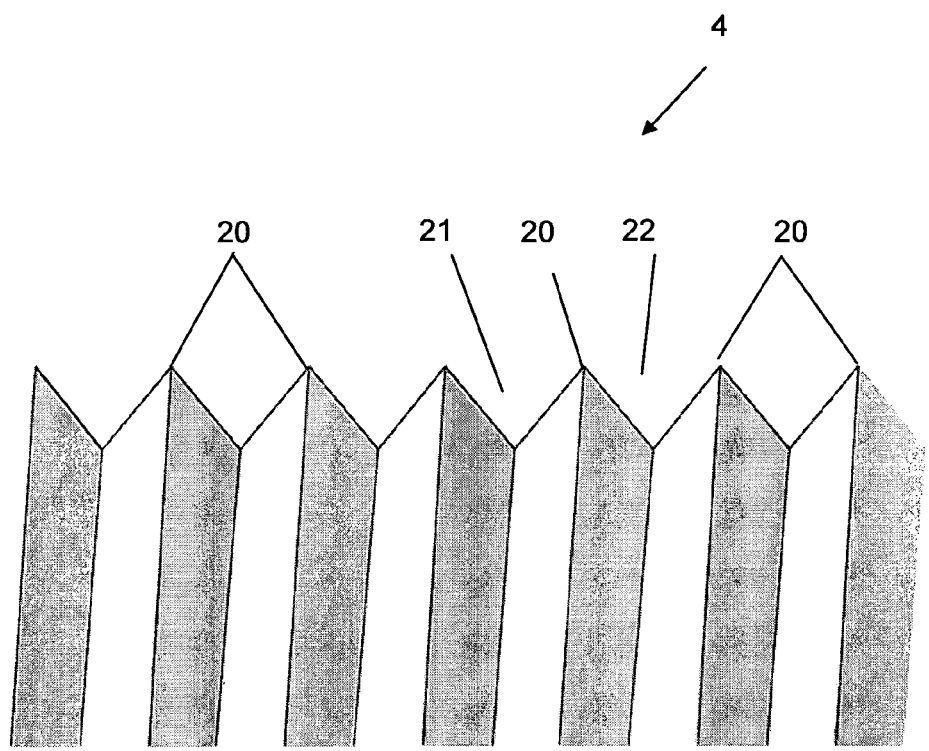
FIG. 2 shows a schematic view of an edge portion of an applicator according to one embodiment of the present invention.

Adjacent 'V' shaped troughs (21, 22) meet at a line to form the crests (20) of the roller (4). Each crest (20) has a sharp edge as shown in FIG. 2, such that the series of crests form a zigzag pattern in cross section.

The glue roller (4) is rotatably mounted alongside the second corrugating roller (3), the axis of rotation of the glue roller (4) being substantially parallel to the axis of rotation of the corrugating roller (3). The axis of the glue roller (4) is displaced from the axis of the second corrugating roller (3) by a distance such that the crests (20) of the glue roller (4) hold against the crests of the fluted sheet (8) held in the teeth of the second corrugating roller (3).

A pick-up roller (5) is rotatably mounted on an axis substantially parallel to the axis of the glue roller (4), and is arranged such that the surface of the pick-up roller (5) makes firm contact with each crest of the glue roller (4).

A bath (6) contains adhesive in the form of Adhesin™ Z9129W. The bath (6) is arranged such that the outer surface of the pick-up roller (5) is coated with Adhesin™ Z9129W as the pick-up roller (5) rotates.

The first corrugating rollers (2), second corrugating roller (3), the glue roller (4) and pick-up roller (5) all have a width comparable to the width of the fluted sheet (8).

Adhesive is transferred from the surface of the pick-up roller (5) into the troughs (21, 22) of the glue roller (4). The adhesive is carried by the glue roller (4) as it rotates at a peripheral speed corresponding to the corrugating roller when the glue roller contacts a crest of the fluted paper (8) along the contact line (9), at which point the adhesive is transferred from the troughs (21, 22) onto the crest (18) in the form of droplets.

Figure 3A:
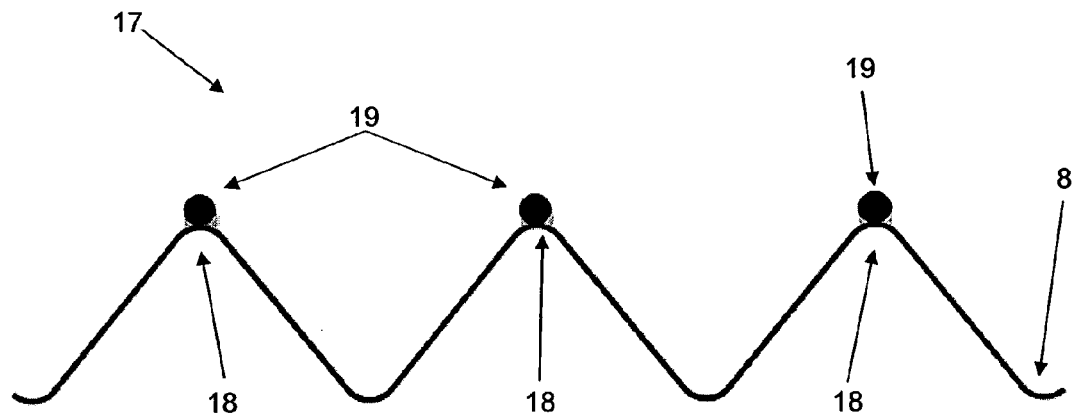
FIG. 3A shows a schematic side elevation of a fluted sheet with droplets of adhesive applied to the crests.

A schematic side elevation of a sheet of fluted paper, in which droplets (19) have been deposited onto the crests (18), is generally indicated by arrow 17 in FIG. 3A.

Figure 3B:
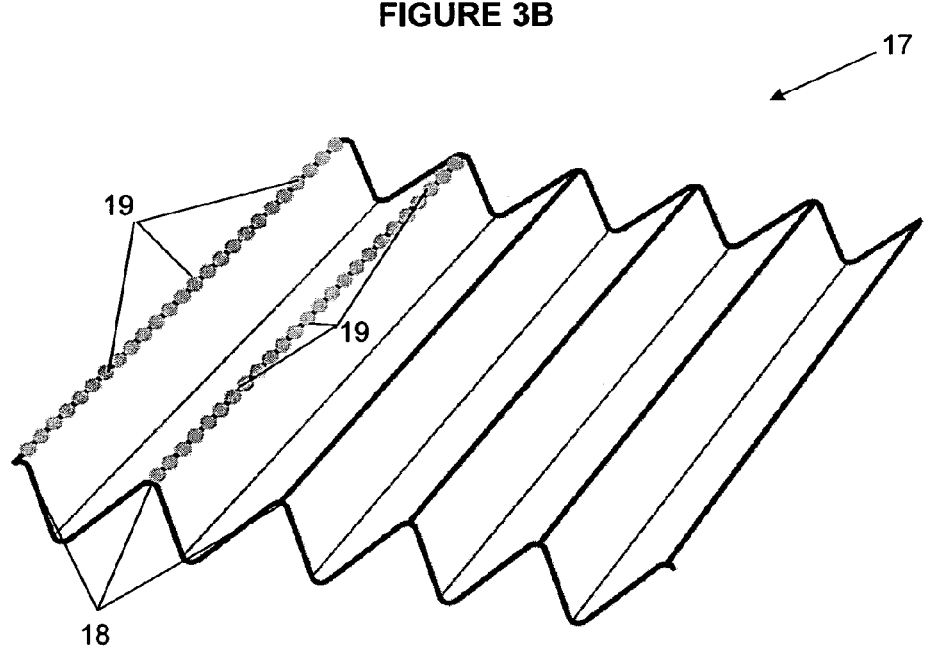
FIG. 3B shows a schematic perspective view of a fluted sheet with a line of spaced apart droplets of adhesive along two of the crests.

FIG. 3B shows a schematic perspective view of a plurality of discrete droplets (19) deposited along a crest (18) of a sheet of fluted paper.

Referring back to FIG. 1, a second planar sheet of Kraft paper, in the form of a liner (10) is pressed against the fluted sheet (8) by a tensioned belt assembly generally indicated by arrow (17).

The endless belt (13) is held in place against the periphery of the second corrugating roller (3) by the action of the first guide end roller (11), second guide end roller (12), two guide rollers (14) and a tensioning roller (23) as known in the prior art.

The separation of the first guide end roller (11) from the second guide end roller (12) determines the length over which the endless belt (13) applies pressure to the liner (10). This separation corresponds approximately to three quarters of the periphery of the second corrugating roller (3), this being approximately the maximum length available (so as to leave room for the first corrugating roller (2) and the glue roller (4).

Tension is applied to the endless belt (13) by adjusting radially (with respect to the axis of the second corrugating roller (3)) the position of the tensioning roller (23).

In practice tension in the belt (13) is adjusted to the point where damage, typically in the form of creasing or tearing of the liner and/or fluted paper, occurs. The tension, is then reduced by backing off the tensioning roller (23) to the lowest tension below this threshold where damage does not occur. The amount of tension applied to belt (13) to achieve the correct pressure of the belt (13) against the roller (3) depends on many factors including the nature of the sheet materials used for the liner and fluted sheets. The joining of the liner (10) to fluted paper (8) forms corrugated board (15).

A pick (24) is located in the vicinity immediately after the guide end roller (12). The pick (24) is used to help release the bonded single face corrugated board (15) from being held by the vacuum inside the second corrugating roller (3).

The rate of production of single face corrugated board (15) in this arrangement is determined by the diameter and rotation speed of the second corrugating roller (3). With the endless belt (13) extending around approximately three quarters of the periphery of the second corrugating roller (3), this fixes the rotation time at around 20 revolutions per minute, independent of the diameter of the roller (3). However, the amount produced is dependent on the diameter, D (measured in meters), of the roller (3) and is given (for the configuration described above) by $20\pi D$ meters per minute, ie., around 63 times the diameter of roller (3) (measured in meters) meters per minute.

For example, a second corrugating roller (3) having a diameter of 1.6 m may produce around 100 m/min of singled face paper board.

Figure 1A:
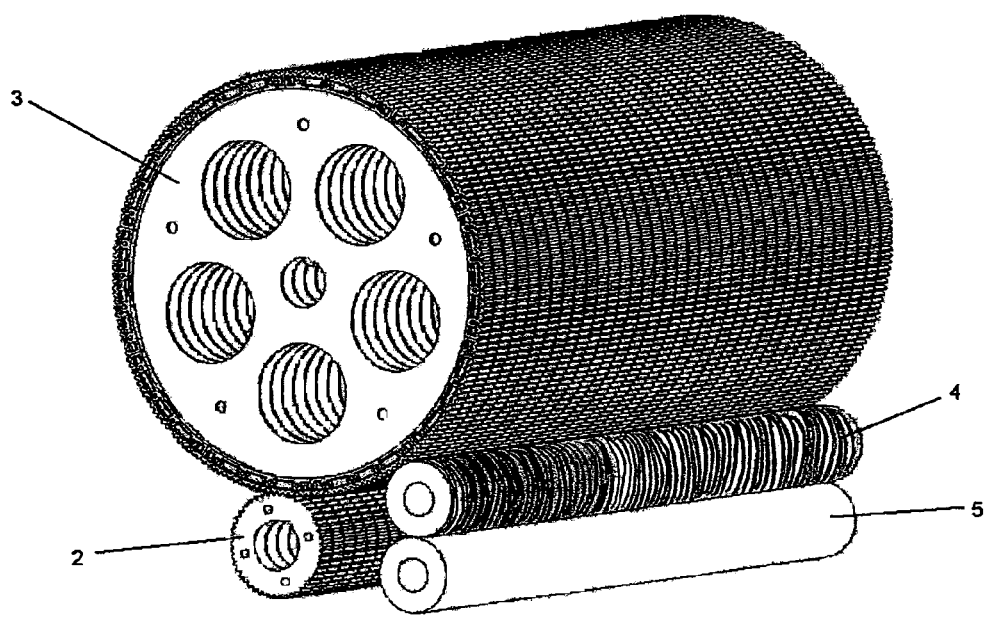
FIG. 1A shows a close up of the applicator portion of the machine in FIG. 1 according to one embodiment of the present invention.

FIG. 1A is a close-up of the machine shown in FIG. 1 and shows more clearly the corrugations on the glue roller 4A.

Aspects of the present invention have been described by way of example only and it should be appreciated that modifications and additions may be made thereto without departing from the scope thereof as defined in the appended claims.

What is claimed is:

1. A machine for making single face corrugated board without the use of steam by bonding a corrugated sheet material having one or more crests onto a substantially planar sheet, the machine comprising:
    a glue applicator roller having a contoured outer surface in the form of corrugations comprising a series of adjacent grooves completely encircling the surface of the roller which are spaced substantially 1 mm apart from each other and are 0.5 mm deep into which adhesive is deposited, the roller being configured to apply 0.5 $mm^3$ of adhesive in discrete, spaced apart, pear or round shaped droplets, to the crest of the corrugated sheet material, the pear or round shaped droplets being formed as droplets, as a consequence of the adhesive being drawn out of the grooves, and wherein the roller is configured to place the droplets so they are spaced apart by a gap, such that when the droplets become spread and meet one another, the adhesive on the crests reaches a predetermined thickness; and
    a pressing mechanism configured to hold the planar sheet against the crest until a bond is formed between them;
    wherein the machine is not configured to use steam and does not comprise a boiler, pipe work or a housing to ensure containment of steam.

2. A machine as claimed in claim 1 wherein the crests of the corrugations on the roller form a spiral.

* * * * *